United States Patent [19]

Fukunaga

[11] Patent Number: 5,428,096
[45] Date of Patent: Jun. 27, 1995

[54] OIL-REPELLENT FLUORORUBBER COMPOSITION

[75] Inventor: Noritomo Fukunaga, Tokyo, Japan

[73] Assignee: Kinyosha Company, Limited, Tokyo, Japan

[21] Appl. No.: 198,632

[22] Filed: Feb. 18, 1994

[30] Foreign Application Priority Data

Feb. 22, 1993 [JP] Japan .................................. 5-054653

[51] Int. Cl.⁶ ........................ C08J 3/20; C08K 3/08; C08L 15/02
[52] U.S. Cl. .................................. 524/440; 524/544; 524/545; 524/546; 524/439; 524/441; 525/185; 525/326.3; 525/387; 526/255
[58] Field of Search ............... 524/440, 544, 545, 546, 524/439, 441; 525/185, 326.3, 387; 526/255

[56] References Cited

U.S. PATENT DOCUMENTS 3,853,809  12/1974  Martin et al. .................... 260/42.37
5,296,549   3/1994  Suyama et al. ................... 525/326.3

Primary Examiner—Paul R. Michl
Assistant Examiner—U. K. Rajguru
Attorney, Agent, or Firm—Sherman and Shalloway

[57] ABSTRACT

An oil-repellent fluororubber composition obtained by compounding a low-molecular weight tetrafluoroethylene resin with a peroxide crosslinked fluororubber having a Mooney viscosity of 90 or more $ML_{1+10}$ (100° C.) or compounding a low-molecular weight tetrafluoroethylene resin and an inorganic filler selected from powders of solid substances, such as iron, nickel, cobalt, iron-cobalt alloy, molybdenum, tungsten, tantalum and tungsten-carbide, having surface energy higher than that of copper with a peroxide crosslinked fluororubber. An oil-repellent fluororubber elastomer having excellent oil repellency and at the same time maintaining original mechanical and physical characteristics sufficiently can be obtained, using easily available materials on the market without any special means of processing and treatment.

13 Claims, No Drawings

OIL-REPELLENT FLUORORUBBER COMPOSITION

FIELD OF THE INVENTION

The present invention relates to an oil-repellent fluororubber composition, and, more specifically, to an oil-repellent fluororubber composition prepared by compounding a low-molecular weight ethylene tetrafluoride resin with a peroxide crosslinked fluororubber having a Mooney viscosity of 90 or more $ML_{1+10}(100° C.)$ or compounding a low-molecular weight ethylene tetrafluoride resin and an inorganic filler selected from the powders of solid substances having surface energy higher than that of copper to a peroxide crosslinked fluororubber.

PRIOR ARTS

Conventionally, fluororubber products have been used primarily as heat-resistant and oil-resistant materials for oil seal components for cars, diaphragms, tubes, hoses, gaskets and O-rings, as packing materials for chemical resistance, as sealing materials for ozone resistance and as wire coating materials, their excellent heat resistance, oil resistance, chemical resistance, solvent resistance and high-corrosive gas resistance being utilized. However, according to the object of use and conditions in use, fluororubber products hardly have oil repellency as is described hereunder and hence are poor in oil resistance to some kinds of oils, not showing sufficient endurance. Hence, some attempts to impart oil repellency to fluororubber products have been taken with a view to improving endurance, and various methods have been proposed. The methods are divided largely into 1) methods of modifying the surface of a fluororubber product and 2) methods of modifying the composition of a fluororubber composition.

As the method 1) have been performed a treatment according to fluorine gas, a treatment according to chemicals having reactivity with fluororubbers and, as a more general method, surface coating with a fluorine resin (selected from a polytetrafluoroethylene resin, an ethylene tetrafluoride-perfluorovinyl ether copolymer resin, an ethylene tetrafluoride-propylene hexafluoride copolymer resin and the like according to temperature conditions for use).

As the method 2), generally the compounding of a powder of a fluorine resin as above to a fluororubber is performed.

In addition, the irradiation of high-energy radiations of 10 to 30 Mrad is carried out.

However, fluororubber products subjected to a surface treatment come to lose oil repellency due to the breakage and peeling of the surface layer caused by repeated loading in use (compression, abrasion, extension, etc.). On the other hand, products from the composition with only a fluorine resin powder compounded therein do not lose oil-repellency in use, but they deteriorate in their rubber strength and physical properties, particularly, in their extension; hence both cannot be said to be satisfactory modifications.

PROBLEMS FOR THE INVENTION TO SOLVE

Accordingly, the object of the present invention is to provide an oil-repellent fluororubber elastomer having excellent oil repellency hardly impaired in use and in addition having sufficient mechanical and physical characteristics which a fluororubber elastomer originally possesses.

MEANS FOR SOLVING THE PROBLEMS

According to the present invention, an oil-repellent fluororubber composition prepared by compounding a low-molecular weight ethylene tetrafluoride resin to a peroxide crosslinked fluororubber having a Mooney viscosity of 90 or more $ML_{1+10}(100° C.)$ (a first invention) or compounding a low-molecular weight ethylene tetrafluoride resin and an inorganic filler selected from the powders of solid substances having surface energy higher than that of copper to a peroxide crosslinked fluororubber (a second invention) can be obtained.

Hereunder, the embodiment of the present invention will be described specifically.

As crosslinking methods of a fluororubber have been developed such methods taking advantage of the characteristics of polymers as amine crosslinking, polyol crosslinking, peroxide crosslinking and the like, and in addition, the development of polymers suitable for each crosslinking method has been conducted.

The peroxide-type fluororubber to be used in the present invention is a flurorubber having halogen, particularly, bromine and/or iodine and a hydrogen atom introduced into the terminal of a polymer molecular chain and the side chain, and crosslinking is conducted according to a drawing reaction of a halogen atom and a hydrogen atom. In Examples of the present invention, crosslinking is carried out in a conventional manner, using a radical generator represented by an organic peroxide compound as a crosslinking agent and a crosslinking auxiliary, generally triallyl isocyanurate. It is one of the main characteristics of the present invention to choose and use a peroxide crosslinked fluororubber as a base material of the oil-repellent composition of the present invention. As is apparent according to Comparative Test to be described later, satisfactory oil repellency cannot be obtained by an amine crosslinked fluororubber and a polyol crosslinked fluororubber.

As a peroxide crosslinked fluororubber, those having a high molecular weight with a Mooney viscosity of 90 or more $ML_{1+10}(100° C.)$ are preferable. As is shown in Comparative Test to be described later, those with a low Mooney viscosity cannot form an elastomer having sufficient oil repellency.

A low-molecular weight ethylene tetrafluoride resin to be used as an oil-repellency imparting agent in the present invention is a polymer of ethylene tetrafluoride having a molecular weight of the order of $10^3$ to $10^5$ and it has been used as an additive for the decrease of the coefficient of dynamic friction, the improvement of abrasion resistance or the improvement of tear strength of rubber, plastics, oil, ink and paints. Commercially available examples include Lubron* L-5, L-2 (Daikin Kogyo), MP* 1100, 1200, 1300, 1400, 1500, and TLP*-10F-1 (Mitsui-DuPont Fluorochemicals) (*: trademark, hereunder same as above).

Though the compounding ratio of a low-molecular weight ethylene tetrafluoride resin is not particularly restricted, it is preferable to compound 60 weight parts or more of it based on 100 weight parts of a fluororubber in order to impart sufficient oil repellency. An ethylene tetrafluoride resin to be used for forming has a high molecular weight of the order of $10^6$, and it is difficult to compound such a resin in a fluororubber in a large amount and uniformly and, therefore, it is not suited to be used in the present invention.

A second invention is characterized by the point that an inorganic filler comprising a solid element and/or an inorganic compound powder having surface energy higher than that of copper is compounded in an oil-repellent fluororubber composition in addition to a low-molecular weight ethylene tetrafluoride resin.

Generally, MT carbon black, or an inorganic filler such as powders of silica, alumina and copper is compounded in order to improve the rubber strength and physical properties of fluororubber.

However, the following have been revealed: when powders of various kinds of carbon black, silica, alumina and copper, which have been ordinarily used, are used as inorganic fillers, the rubber strength and physical properties can be maintained, but that oil repellency is impaired remarkably and the effects of a first invention cannot be exhibited at all.

The present inventor made studies about the properties, functions and effects of various inorganic fillers. As a result, he has found that, contrary to the general anticipation regarding the wetting of a solid material and surface energy, by the use of an inorganic material having extremely high surface energy, particularly a powder of a solid material (a solid element and a solid inorganic compound) having surface energy higher than that of copper, the effects according to a first invention, that is, the strength and physical properties, can be imparted without impairing excellent oil repellency. This finding has led to the completion of a second invention. Specific examples of inorganic fillers preferably used in Examples of a second invention are powders of iron, nickel, cobalt, iron-cobalt alloy, molybdenum, tungsten, tantalum and tungsten-carbide.

The compounding amount of these inorganic fillers is not particularly restricted; from the viewpoints of the rubber strength and physical properties, however, it is preferably used in an amount of 20 weight parts or more based on 100 weight parts of a fluororubber. A powder preferably used as an inorganic filler has an average particle diameter of 1–15 $\mu$m or less. Powders with an average particle diameter of more than 15 $\mu$m separate from vulcanized rubber products and may impair their smoothness.

Hereunder, the present invention will be described in detail according to Examples.

Comparative Test

Comparative Test on oil repellency was carried out according to the following procedure:

A sheet of 10 mm×30 mm×1 mm thickness was prepared from each rubber. One side of a sheet was abraded with a sandpaper #1200 to prepare a test sample. The test sample was provided in a surface tension measuring instrument manufactured by Kyowa Kagaku, and dimethyl polysiloxane oil with a viscosity of 50 cSt. was dropped on the test sample at room temperature (25° C.) to measure the contact angle ($\theta$°), a criterion of oil repellency.

Incidentally, the $\theta$° of an ordinary fluororubber elastomer measured according to this test was 0°, which showed that it was substantially non-oil-repellent. The $\theta$° of a polytetrafluroethylene resin, which is deemed to have a high oil repellency, was 24°.

EXAMPLE 1

Comparison in types of crosslinking

| (A) Amine crosslinking | |
|---|---|
| Compounding: weight parts | |
| Daiel* G-501 | 100 (Daikin Kogyo) |
| Magnesium oxide 1) | 15 |
| V-3 2) | 3 |
| Lubron* L-2 3) | 90 |
| Vulcanization: | |
| Press vulcanization | 160° C. × 20 minutes |
| Oven heating | 200° C. × 24 hours |
| 1) Kyowamag* 30 (Kyowa kagaku Kogyo) | |
| 2) Vulcanizing agent N,N-dicinnanmylidene-1,6-hexane-diamine (Daikin Kogyo) | |
| 3) Low-molecular weight polytetrafluoroethylene (Daikin Kogyo) | |
| (B) Polyol crosslinking | |
| Compounding: weight parts | |
| Daiel* G-701 | 100 (Daikin Kogyo) |
| Calcium hydroxide 4) | 6 |
| Magnesium oxide 5) | 3 |
| Lubron* L-2 | 90 |
| Vulcanization: | |
| Press vulcanization | 170° C. × 10 minutes |
| Oven heating | 230° C. × 24 hours |
| 4) Culdic* 2000 (Omi Kagaku Kogyo) | |
| 5) Kyowamag* 150 (Kyowa Kagaku Kogyo) | |
| (C) Peroxide crosslinking | |
| Compounding: weight parts | |
| Daiel* G-912 | 100 (Daikin Kogyo) |
| Triallyl isocyanurate 6) | 4 |
| Perhexa* 2 5B 7) | 1.5 |
| Lubron* L-2 | 90 |
| Vulcanization: | |
| Press vulcanization | 160° C. × 10 minutes |
| Oven heating | 180° C. × 4 hours |
| 6) Talc*, vulcanizing auxiliary (Nihon Kasei) | |
| 7) Peroxide* 2,5-dimethyl-2,5-di-t-butyl peroxy-hexane (Nihon Yushi) | |
| Results of tests: | |
| | Contact angle $\theta$° |
| Amine crosslinking | 15 |
| Polyol crosslinking | 11 |
| Peroxide crosslinking | 18 |

| Compounding: weight parts | |
|---|---|
| Rubbers each having a different | |
| Mooney viscosity 8) | 100 |
| Triallyl isocyanurate | 4 |
| Perhexa* 2.5B | 1.5 |
| Lubron* L-2 | 90 |
| Vulcanization: | |
| Press vulcanization | 160° C. × 10 minutes |
| Oven heating | 180° C. × 4 hours |
| 8) Daiel Mooney viscosity ML $_{1+10}$ (100° C.) | |
| G-912 | 76 |
| G-901 | 97 |
| G-901H | 159 |
| Results of tests: | |
| | Contact angle $\theta$° |
| G-912 | 18 |
| G-901 | 24 |
| G-901H | 25 |

According to the above results, it is apparent that peroxide crosslinking is superior to amine crosslinking and polyol crosslinking in oil repellency.

EXAMPLE 2

Influence of Mooney viscosity peroxide crosslinking

A particle of an inorganic filler to be used in the present invention is not restricted to a particle of a single material. It may have a double constitution of a core of a material with low surface energy and a coating layer of a material with high surface energy.

Vulcanizing conditions can also be changed properly. Though standard oven heating conditions are 180° C. and 4 hours, they may be 250° C. and 24 hours. Besides, primary vulcanization and secondary oven heating can be conducted in vacuum or in inactive gas such as carbon dioxide gas, helium gas, argon gas or nitrogen gas. In primary vulcanization and/or secondary heating, radiations can also be utilized. If desired, ultraviolet-light irradiation or a fluorine gas treatment can be employed in a crosslinked rubber.

Moreover, the following substances can be compounded in the oil-repellent fluororubber composition of the present invention in such a range as would not substantially impair its excellent oil repellency in order to impart or improve special properties.

Improvement of the physical characteristics of rubbers: carbon black such as MT and FT Imparting of conductivity: Ketchen black (Ketchen* EC), acetylene black, carbon fiber, conductive metal coating powder, inorganic and ceramic whisker powder Prevention of static electrification: various antistatic agents, surfactants Improvement of abrasion resistance: mica powder and the like Imparting of processability: thermoplastic fluororubber (Daiel* thermoplastics), low-molecular weight liquid flurororubber (Daiel* G-101) and fluorosilicone oil and fluorosilicone rubber, fluorine oil Compatibility improving agents and thermoresistance additives: silicone oil and reactive silicone oil, silicone resin, silicone coupling agents Low-temperature properties imparting agent: vinyl silicone rubber, fluorophosphazene polymer, fluorinated acrylic polymer Others:PFA (tetrafluoroethylene-perfluorovinyl ether copolymer resin), FEP (tetrafluoroethylenehexafluoropropylene copolymer resin), tetrafluoroethylene oligomers and reactive perfluoroalkylating agents, perfluoroalkyl compounds, fluoroether compounds, fluoroalkylvinyl ether compounds

EXAMPLE 3

Influence of Mooney viscosity in compounds with fillers

A compound was prepared from 4 kinds of peroxide crosslinked fluororubbers with different Mooney viscosities according to the following compounding recipe.

| Compounding: weight parts | |
|---|---|
| Raw fluororubber | 100 |
| TAIC* | 4.0 (Nihon Kasei) |
| Perhexa* 25B | 1.5 (Nihon Yushi) |
| Lubron* L-2 | 60.0 (Daikin Kogyo) |
| Fe50Co* | 75.0 (Kobe Seiko) |
| MT carbon black | 5.0 (R. T. Vanderbilt) |

TABLE 1

| Raw fluoro-rubber | Mooney viscosity $ML_{1+10}$ (100° C.) | Contact angle $\theta$° |
|---|---|---|
| Daiel* | | |
| G-902 | 50 | 17 |
| G-912 | 76 | 19 |
| G-901 | 97 | 26 |
| G-901H | 159 | 28 |

EXAMPLE 4

Influence of the compounding amount of low-molecular weight ethylene tetrafluoride The same procedure as in Example 3 was repeated by changing the compounding amount of low-molecular weight ethylene tetrafluoride.

| Compounding: weight parts | |
|---|---|
| Daiel* G-901 | 100 |
| TAIC* | 4.0 |
| Perhexa 25B | 1.5 |
| Fe50Co* | 75.0 |
| MT carbon black | 5.0 |
| Lubron* L-2 | variate |

The results of the test are as shown in Table 2.

TABLE 2

| Lubron* L-2 (variate weight parts) | Contact angle $\theta$° |
|---|---|
| 40 | 21 |
| 60 | 26 |
| 80 | 28 |
| 120 | 31 |

EXAMPLE 5

Influence of the kinds and the compounding amount of inorganic fillers

The same procedure as in Example 3 was repeated except that the kinds and the compounding amount of inorganic fillers were changed.

| Compounding: weight parts | |
|---|---|
| Daiel* G-901 | 100 |
| TAIC* | 4.0 |
| Perhexa* 25B | 1.5 |
| MT carbon black | 5.0 |
| Lubron* L-2 | 60.0 |
| Inorganic filler | variate |
| Inorganic fillers: | |
| Spherical copper powder MA-CDS (−30 meshes) | Mitsui Kinzoku Kogyo |
| Cobalt powder | Nihon Atomize Kako |
| Nickel powder | Nihon Atomize Kako |
| Cobalt-iron alloy powder Fineatomel* Fe50Co | Kobe Seiko |
| Tungsten powder W-5 | Nihon Shin Kinzoku |
| Tungsten carbide powder (WC-60, particle diameter: 5.07–7.01 μm) | Tokyo Tungsten |

The results are as shown in Table 3.

TABLE 3

| Inorganic filler | Specific gravity | Compounding weight parts | Contact angle $\theta$° |
|---|---|---|---|
| Cu | 8.92 | 80 | 18 |
| Co | 8.90 | 80 | 27 |
| Co.Fe | 8.38 | 75 | 26 |

TABLE 3-continued

| Inorganic filler | Specific gravity | Compounding weight parts | Contact angle $\theta°$ |
|---|---|---|---|
| Ni | 8.85 | 80 | 24 |
| W | 19.30 | 170 | 33 |
| WC-60 | 15.7 | 140 | 30 |

The constitution and the effects of the present invention have been described above; it is apparent to those skilled in the art that various modifications are possible so far as they do not deviate from the range and the spirit of the present invention.

EFFECTS OF THE INVENTION

An oil-repellent fluororubber elastomer having excellent oil repellency and at the same time maintaining original mechanical and physical characteristics sufficiently can be obtained, using easily available materials on the market without any special means of processing and treatment.

I claim:

1. An oil-repellent fluororubber composition prepared by compounding a low-molecular weight ethylene tetrafluoride resin, with a peroxide crosslinked fluororubber.

2. The oil-repellent fluororubber composition according to claim 1 wherein said fluororubber has a Mooney viscosity of 90 or more $ML_{1+10}$ (100° C.).

3. The oil-repellent fluororubber composition according to claim 1 wherein said low-molecular weight ethylene tetrafluoride resin is compounded in an amount of 60 weight parts or more based on 100 weight parts of said fluororubber.

4. The oil-repellent fluororubber composition according to claim 1 wherein said fluororubber is in a vulcanized state.

5. An oil-repellent fluororubber composition prepared by compounding a low-molecular weight ethylene tetrafluoride resin and an inorganic filler selected from the groups consisting of powders of solid substances having surface energy higher than that of copper with a peroxide crosslinked fluororubber.

6. The oil-repellent fluororubber composition according to claim 5 wherein said fluororubber has a Mooney viscosity of 90 or more $ML_{1+10}$ (100° C.).

7. The oil-repellent fluororubber composition according to claim 5 wherein said low-molecular weight ethylene tetrafluoride resin is compounded in an amount of 60 weight parts or more based on 100 weight parts of said fluororubber.

8. The oil-repellent fluororubber composition according to claim 5 wherein said inorganic filler is selected from the group consisting of powders of iron, nickel, cobalt, iron-cobalt alloy, molybdenum, tungsten, tantalum and tungsten-carbide.

9. The oil-repellent fluororubber composition according to claim 5 wherein said inorganic filler has an average particle diameter of 15 $\mu$m or less.

10. The oil-repellent fluororubber composition according to claim 5 wherein said inorganic filler is compounded in an amount of 20 weight parts or more based on 100 weight parts of said fluororubber.

11. The oil-repellent fluororubber composition according to claim 5 wherein said fluororubber is in a vulcanized state.

12. The oil-repellant fluororubber composition according to claim 5 wherein said ethylene tetrafluoride resin has a molecular weight in the range of from $10^3$ to $10^5$.

13. The oil-repellant fluororubber composition according to claim 1 wherein said ethylene tetrafluoride resin has a molecular weight in the range of from $10^3$ to $10^5$.

* * * * *